C. E. BAKER & E. M. DE LONG.
MOTOR VEHICLE FRAME.
APPLICATION FILED JULY 8, 1910.

1,125,442.

Patented Jan. 19, 1915.
2 SHEETS—SHEET 1.

C. E. BAKER & E. M. DE LONG.
MOTOR VEHICLE FRAME.
APPLICATION FILED JULY 8, 1910.

1,125,442.

Patented Jan. 19, 1915.
2 SHEETS—SHEET 2.

UNITED STATES PATENT OFFICE.

CHARLES E. BAKER AND EVERETT M. DE LONG, OF HARTFORD, CONNECTICUT, ASSIGNORS, BY MESNE ASSIGNMENTS, TO THE NEW BRITAIN MACHINE COMPANY, OF NEW BRITAIN, CONNECTICUT, A CORPORATION OF CONNECTICUT.

MOTOR-VEHICLE FRAME.

1,125,442.     Specification of Letters Patent.     Patented Jan. 19, 1915.

Application filed July 8, 1910. Serial No. 570,950.

*To all whom it may concern:*

Be it known that we, CHARLES E. BAKER and EVERETT M. DE LONG, citizens of the United States, and residents of Hartford, in the county of Hartford and State of Connecticut, have invented a new Improvement in Motor-Vehicle Frames, of which the following is a specification.

Our invention relates to that class of devices embodied in motor vehicle construction, and more especially to that class embodied in the construction of motorcycles, and objects of our invention, among others, are to provide a frame that shall have great strength; one in which driving mechanism may be readily mounted, and one in which the removal of parts may be effected without collapse of the frame. And a further object of the invention is to provide a frame which shall be peculiarly free from shocks and strains incident to running over rough surfaces.

One form of frame embodying our invention and in the construction and use of which the objects above set out, as well as others, may be attained is illustrated in the accompanying drawings, in which—

Figure 1:
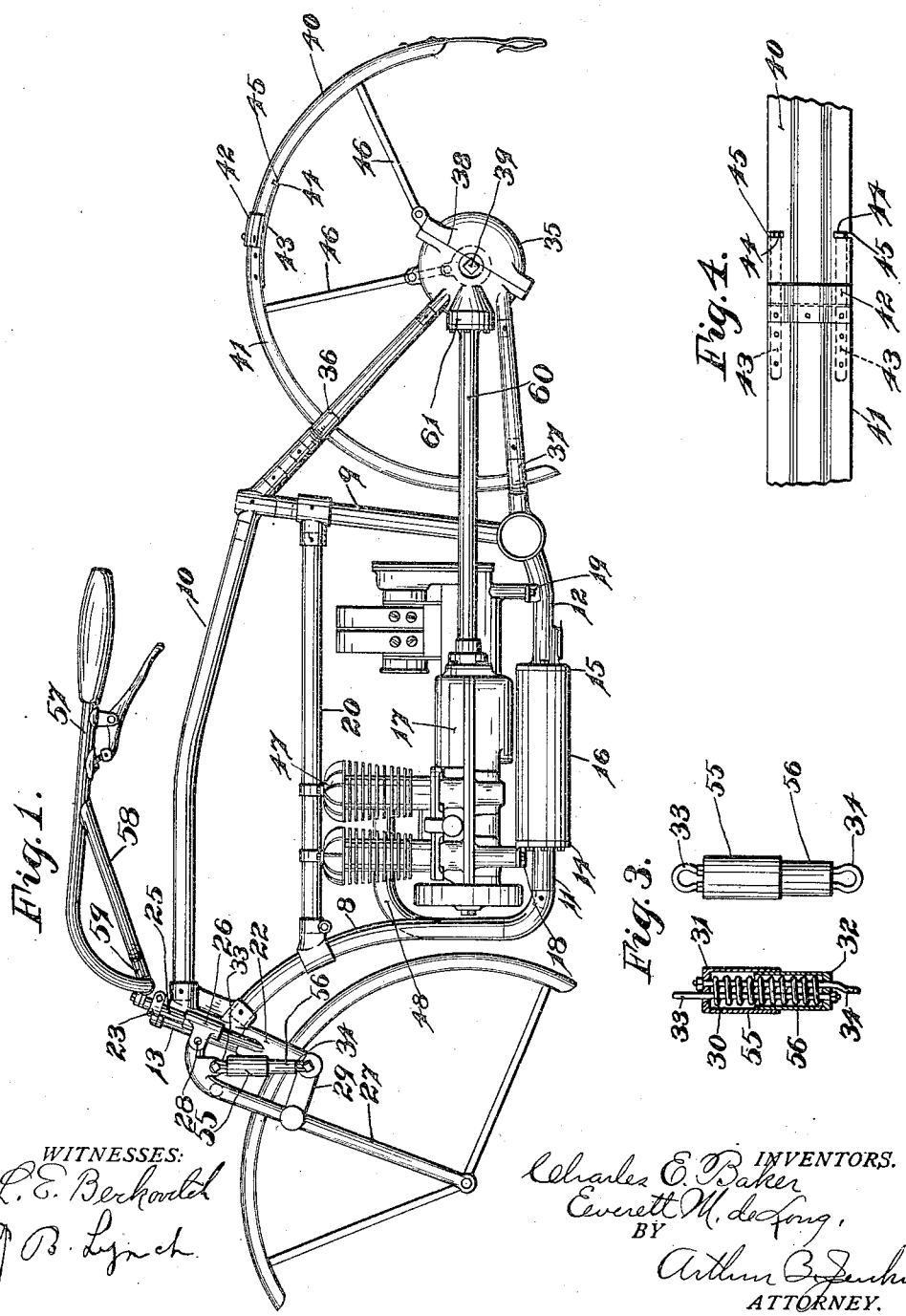
Figure 2:
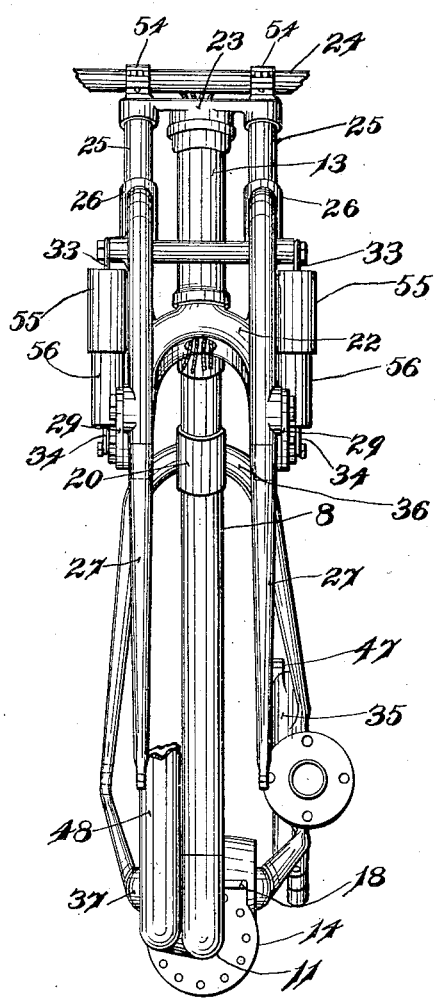
Figure 5:
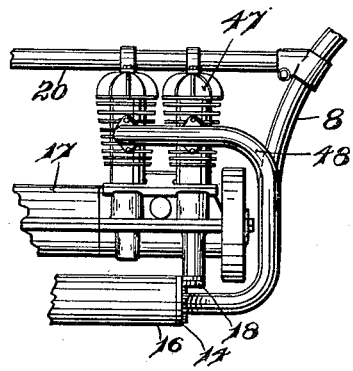
Figure 6:
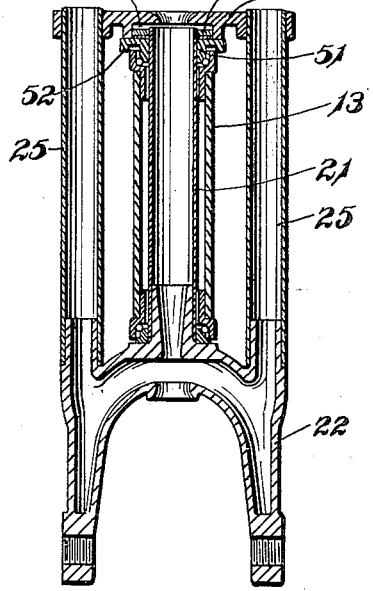

Figure 1 is a view in side elevation of a vehicle frame embodying our improvement. Fig. 2 is a front view of the same, omitting the crank casing. Fig. 3 shows in side elevation and in section the construction of the fork supporting springs. Fig. 4 is a detail view illustrating the construction of the mud-guard. Fig. 5 is a detail view of a portion of the lower part of the frame showing the side opposite to that shown in Fig. 1. Fig. 6 is a detail view on enlarged scale in lengthwise section through the head and steering frame.

In the accompanying drawings the numeral 8 indicates a front drop member of the frame, 9 a rear upright member of the frame, 10 the top member, 11 the forward section of the bottom member and 12 the rear section of the bottom member of the frame.

The members 8 and 10 are joined by a tubular head 13 and the forward section 11 of the bottom member of the frame is rigidly secured to the drop member 8 in any suitable manner. Each of the members 11, 12 terminate in plates 14, 15 which are rigidly secured to the members and which plates form the ends of a muffler 16 extending between the sections 11, 12. The muffler thus forms a part of the bottom member of the frame, which bottom member is thus made up of the sections 11, 12 and the muffler 16. The muffler as to its function as such may be of any suitable construction, and detailed description and illustration thereof are consequently omitted herein.

The sections 11, 12 are constructed to support a casing 17, this casing constituting the crank and transmission casing of the driving mechanism upon which an engine 47 may be secured. In the form of construction as herein shown a shelf 18 extends from the plate 14 upon which one end of the casing is secured, and a support 19 to which the other end of the casing is secured is sustained by the section 12 of the lower frame member.

An exhaust tube 48 is rigidly secured to the engine and extends preferably alongside of and parallel with the upright member 8, being rigidly secured to the muffler 16 at one side of the member 8. This exhaust tube thus serves, in addition to its regular function, as a strengthening member, being in fact a part of the frame and located at that point where the frame must resist severe strain and thus forms a reinforcement for the frame at this point.

A strut 20 extends between the members 8 and 9 and serves to impart rigidity to the frame. A crown 22 is located under the tubular head 13 and has a crown shank 21 projecting through the head and held therein as by means of a nut 50 screw-threaded on the end of the shank. Any desired form of bearing to provide for turning movements of the shank may be employed, ball bearings suitably constructed being shown herein. The cone 51 of the upper ball bearing has a flange 52 projecting beyond the edge of the nut 50. A cross-piece 23 overlies the end of the crown shank 21 and is rigidly connected with the crown by means of guides 25. In the preferred form of construction, and as shown herein, the cross-piece has a recess 53 within which the nut 50 is located, the lower surface of the cross-piece forming the edge of this recess having a bearing upon the flange 52. The guides, cross-piece, crown and shank form what I term a steering frame, and a cross-bar 24 of steering handles is secured to the upper part of this frame in any suitable manner, as herein shown clips 54 being employed for the purpose.

The guides 25 extend from the sides of the crown on opposite sides of the crown shank 21 and collars 26 of wheel supports 27 are mounted to slide upon these guides. These supports in connection with the guides form a wheel fork, the lower ends being suitably constructed for attachment to a wheel axle. The supports are pivotally attached to the sleeves as at 28, and links 29 connect each of the supports with the lower end of one of the branches of the crown 22, as plainly shown in Fig. 1 of the drawings.

A spiral spring 30 is mounted between plates 31, 32, the plate 32 having a connection 33 with one of the wheel supports 27, there being a spring for each wheel support. The plate 31 has a connection 34 extending and secured to the lower end of one of the branches of the crown 22. Both of these connections preferably consist of a rod having a loop at its end by means of which it is secured in place, the other end being secured to the plate in any suitable manner. The preferred form of construction of this cushion support for the wheel fork embodies cups 55, 56, the plates 31, 32 forming the bottom of the cups and the springs 30 being located within the cups, the cup 56 telescoping within the cup 55.

From this construction it will be seen that when the wheel mounted in the wheel supports 27 encounters an obstruction and is forced suddenly upward to pass over such obstruction the parts 22 will move upward, the sleeves 26 sliding on the guides 25. This upward movement is resisted by the springs 30 which are compressed, the construction above described enabling the compression of the springs to be utilized to resist the movement of the wheel and thus cushion the frame from the shock.

A gear casing 35 unites the members of the upper rear fork 36 with the members of the lower rear fork 37. This frame is divided on a line 38 extending upwardly in an oblique direction from the front to the rear. The upper section of the case forms a bearing for the frame upon the axle 39 of the rear wheel, and the lower section of the case forms a retainer to hold the axle in place. The parts are thus constructed so that when the sections of the gear case are separated the frame will still be supported by the wheel and will remain so supported until the wheel is intentionally removed.

The rear mud-guard is especially constructed having in view the removal of the rear wheel, the rear section 40 of the mud-guard being removably secured to the forward section 41. In the preferred form of construction and as shown herein a lip 42 extends from the top of the section 41 and bars 43 extend from the under side of the section 41 of the guard. These bars 43 have their ends upturned as at 44 to engage notches 45 in the under edge of the removable section 40 of the mud-guard. Ties 46 extend from the sections of the mud-guard, one to the removable part of the gear casing 35 and the other to a fixed part of the frame. It will be seen from this construction that by loosening the ends of the ties 46 from the frame the section 40 of the mud-guard may be removed and then by disengaging the removable section of the gear casing the rear wheel may be readily taken out, which operation is accomplished with little trouble.

It will be noted from the above description and the accompanying drawings that an extremely rigid frame is provided, members of the mechanism for driving the vehicle in fact forming a part of the frame, but which are so connected up in the frame that any one part may be removed without separating the frame members. The steering frame provides a very rigid, strong support and one in which the vibrations of the front wheel are not communicated to the frame.

A driving shaft sleeve 60 extends from the casing 17 to a pinion casing 61 formed as a part of the gear casing 35, this sleeve forming part of the frame and imparting rigidity to said frame. The driving shaft is located in this sleeve which is detachable so that access may be readily gained to the driving shaft without taking down other parts of the frame. This forms an important feature of our invention.

In order to give rigidity to the handle bars 57 a U-shaped brace 58 is provided with its free ends attached to each of the handle bars and a tie 59 extending from the center of the bend to the cross-bar 24 immediately over the head 13. This strengthens the handle bars from horizontal as well as vertical movement.

We do not limit our invention and the scope of the following claims to the foregoing illustration and description of the preferred form of mechanism in which it has been embodied, as these may be departed from to a greater or lesser extent without avoiding the invention.

We claim—

1. A vehicle frame including a drop member, a rear upright member, a lower frame member connecting the drop and rear upright members, said lower frame member being formed in sections including a muffler as a part thereof, and means for removably securing the muffler in place.

2. A vehicle frame including a drop member and a lower frame member unsupported at their meeting points by other frame parts, an engine supported by the lower frame member, and an exhaust tube extending from the engine and rigidly connected with the lower frame member, said tube being disposed to supplement and reinforce the drop member.

3. A vehicle frame including a drop member and a lower frame member unsupported at their meeting points by other frame parts, an engine supported by the lower frame member, a muffler interposed in the length of the lower frame member and removably and rigidly secured thereto, and an exhaust tube extending from the engine and rigidly connected with the muffler, said tube being disposed to supplement and reinforce the drop member.

4. A vehicle frame including frame members united one to another, a receptacle interposed between the adjacent ends of a frame member and constituting a part of said member, means for rigidly and removably securing the receptacle to the frame member, and a case bridging over said receptacle and rigidly secured to the frame member on opposite sides of the receptacle.

5. A vehicle frame including frame members united one to another, a receptacle interposed between the adjacent ends of a frame member and constituting a part of said member, means for rigidly and removably securing the receptacle to the frame member, a case bridging over said receptacle, and means for rigidly and removably securing the case to the frame member on opposite sides of the joining points of the receptacle to said frame member.

6. A vehicle frame including a front drop member, a rear upright, a strut rigidly connecting said members, a sectional bottom frame member secured to the drop member, a receptacle interposed between the sections of the bottom member and rigidly and removably secured thereto at its ends, an engine supported by the bottom member, and means for rigidly securing the engine to said strut.

7. A frame including a front drop member, a rear upright, a strut connecting said members, a bottom member extending between the front drop member and the rear upright, a receptacle interposed in the length of the bottom member and rigidly and removably secured to its meeting ends, a casing bridging said receptacle and secured to the bottom member on opposite sides of the connection of said receptacle, an engine mounted on said casing, and means for rigidly securing the engine to said strut.

8. A vehicle frame including a sectional gear casing having an axle opening and with the line of division between the sections passing upwardly in a rearward direction through said axle opening, and means for securing the casing sections together.

9. A vehicle frame including a sectional gear casing, one section of which is rigidly secured to the frame and the other removably secured to the first section, a mud guard having one section rigidly secured to the frame, means for removably securing the other section of the mud guard to the first section thereof, and a connection between the removable mud guard section and the removable gear casing section.

10. A vehicle frame including a sectional gear casing having an axle opening and with the plane of division between the two sections of the case passing through said axle opening, one of the sections of the case being rigidly secured to the frame and the other section removably secured to the first section, a mud-guard having one section rigidly secured to the frame, means for removably securing the other section to the first section, and a connection between the removable section of the mud-guard and the removable section of the gear casing.

11. A sectional mud-guard including one section having a lip and a projection extending underneath said lip, a removable section formed to fit underneath said lip, and means for engaging and disengaging the projection and removable section of the guard.

12. A sectional mud-guard having a lip located on one section and a projection extending under the said lip, said projection having an upturned end, and a removable section of the guard fitting underneath said lip and having a recess to receive the upturned end of the projection.

CHARLES E. BAKER.
EVERETT M. DE LONG.

Witnesses:
G. B. LYNCH,
LENA E. BARKOVITCH.

Copies of this patent may be obtained for five cents each, by addressing the "Commissioner of Patents, Washington, D. C."